2 Sheets—Sheet 1.
T. J. ROSS.
Assignor to J. F. PARET.
Adjustable Back for Stools.
No. 8,131. Reissued March 19, 1878.
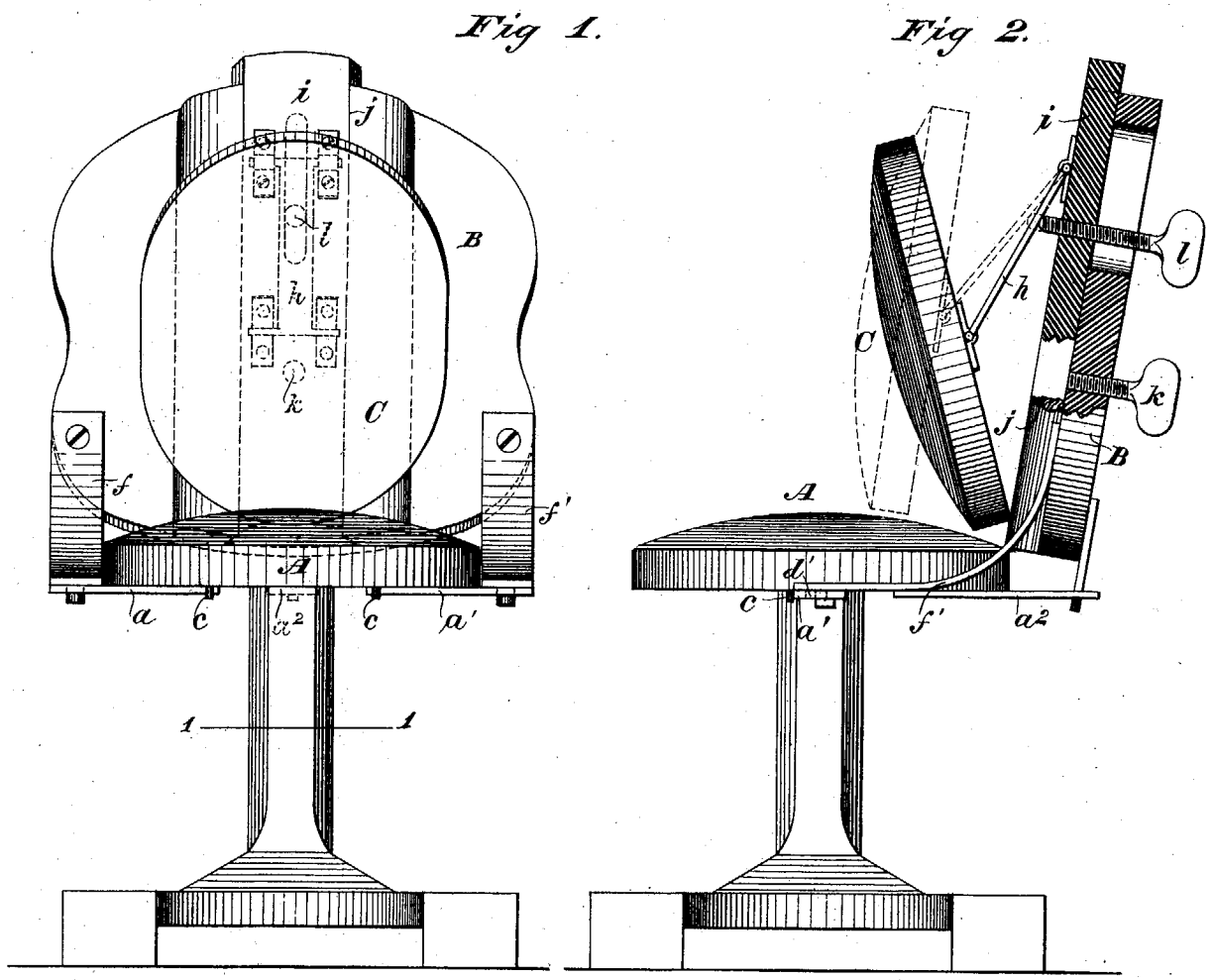
WITNESSES.
Wm A Stinkle
Geo W Breck.
INVENTOR
Thomas. J. Ross.
By his Attorneys.
Baldwin, Hopkins & Peyton
N. PETERS, PHOTO-LITHOGRAPHER, WASHINGTON, D. C.

T. J. ROSS.

Assignor to J. F. BARET.

Adjustable Back for Stools.

No. 8,131. Reissued March 19, 1878.

*WITNESSES*

Wm A Skinkle

Geo W Breck

*INVENTOR*

Thomas J. Ross.

By his Attorneys.

Baldwin, Hopkins & Peyton

N. PETERS, PHOTO-LITHOGRAPHER, WASHINGTON, D. C

UNITED STATES PATENT OFFICE.

THOMAS J. ROSS, OF UNION, NEW YORK, ASSIGNOR TO JOHN F. PARET, OF WASHINGTON, DISTRICT OF COLUMBIA.

IMPROVEMENT IN ADJUSTABLE BACKS FOR STOOLS.

Specification forming part of Letters Patent No. 59,457, dated November 6, 1866; Reissue No. 8,131, dated March 19, 1878; application filed January 28, 1878.

*To all whom it may concern:*

Be it known that I, THOMAS J. ROSS, of Union, in the county of Broome and State of New York, have invented a new and useful Improved Adjustable Back for Stools, Chairs, &c., of which the following is a specification:

The object of the first part of my invention is to render the back detachable and capable of ready removal and replacement with respect to the seat, which ends I attain by pivoting upon the seat swiveling brackets adapted to receive suitable arms, upon which the back is mounted, so that when the swiveling brackets are turned out, the back can readily be connected to the seat; or, if desired to use the stool or seat without a back, the back can be detached, and the swiveling brackets can then readily be turned under the seat, out of the way of the occupant.

The object of the next part of my invention is to render the back adjustable in various ways, to promote the comfort and convenience of the occupant, which ends I attain, first, by combining, with a bed or back, a vertically-adjustable supplemental back or pad, hinged or pivoted so as to be capable of a rocking movement, with a suitable device to hold the supplemental back at any desired elevation relatively to the seat; secondly, by combining, with a bed, back, or support, a supplemental back or pad capable of horizontal as well as vertical adjustment relatively to the seat; thirdly, in combining, with a bed, back, or support, a supplemental back or pad adjustable vertically and horizontally relatively thereto, and having an oscillating or swiveling movement upon its supports, whereby its capacity of accommodation to the varying circumstances under which it is used is greatly increased; and, fourthly, in combining, with a bed, back, or support, a supplemental back or pad capable of being adjusted to or from its support and of rocking upon its hinge or pivot.

Figure 3:
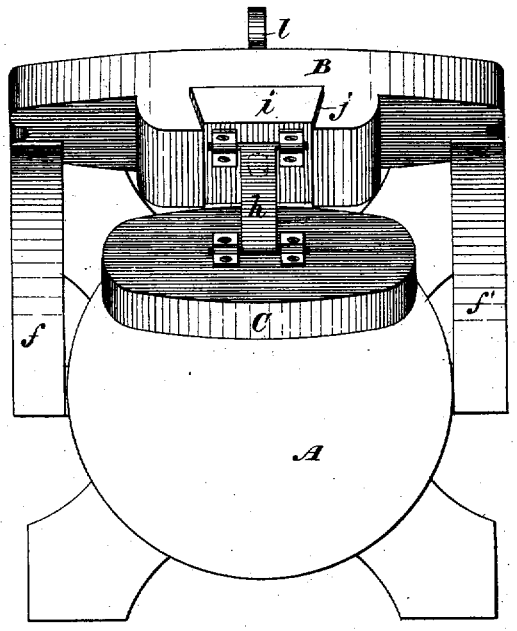
Figure 4:
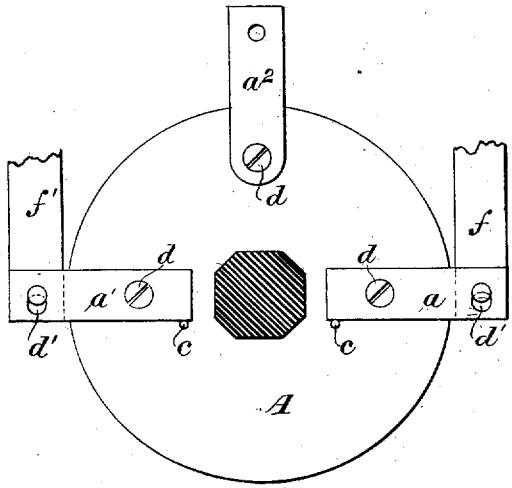

In the accompanying drawings, which form a part of this specification, Figure 1 represents a front elevation of this invention; Fig. 2, a side elevation thereof with the back partly in section, to show the adjusting mechanism and detents more clearly. Fig. 3 is a plan or top view of the same, and Fig. 4 an inverted plan view of the seat detached.

The seat A is shown as mounted upon a suitable support, consisting, in this instance, of a single post or standard; but it may be supported by three or more legs, according to taste. Three brackets, $a$ $a^1$ $a^2$, more or less, are secured to the under side of the seat by screws or pivots $d$, in such manner as to permit the brackets readily to be turned out into a radial position, such as shown in the drawings, and also that they can be turned in under the seat out of the way. Suitable stops $c$ under the seat prevent the brackets from being turned farther than may be necessary or desirable. Sockets $d'$, near the outer ends of the brackets, receive hooks or pins on arms $f$ $f'$, which are secured to the bed or back B, and these arms are so arranged that their hooks or pins will readily enter the sockets when the brackets are in a proper radial position. The bed, back, or support, together with the supplemental back or pad, can thus readily be attached to or removed from the seat whenever desired.

A supplemental back or pad, C, is connected by a link, $h$, with a slide, $i$, fitting in a dovetailed groove, $j$, in the bed or support B, so that by moving the slide up or down the supplemental back can be adjusted to the desired height. A set-screw, $k$, which screws in the bed B and bears on the slide $i$, serves to secure the same, together with the supplemental back, in the required position.

The link $h$ is hinged to the supplemental back or pad C, and also to the slide $i$. A screw, $l$, passing through a slot in the bed or support B, screws in the slide, so that its point can be made to bear on the link; and by turning the screw $l$ in or out, the supplemental back or pad C can be adjusted horizontally, or toward and from the back or support, to suit the person occupying the chair or seat.

The link $h$, it will be observed, is hinged to the supplemental back in such manner as to permit the back to rock upon its hinge or pivot, as indicated by the dotted lines in Fig. 2.

By this means a stool is obtained which can be readily converted into a convenient chair, or which can be used as a stool precisely in the same manner as ordinary stools, and the back is adjustable both vertically and horizontally, or to and from the bed or support, as well as capable of being rocked upon its axis, whereby a wide range of adjustment is secured and the comfort of the occupant promoted.

I disclaim a vertically-adjustable chair-back having an opening near its top to receive an adjustable head-rest, which device differs radically from my invention of a supplemental back having the adjustments claimed.

I claim as new and desire to secure by Letters Patent—

1. The combination of a seat with swiveling brackets pivoted to the under side thereof, the brackets being adapted to receive the supports of a chair-back when swung from under the seat, substantially as described.

2. The combination of a seat, brackets pivoted thereunder, and a back detachably connected with the brackets by arms extending below the seat, substantially as described.

3. The combination, substantially as hereinbefore set forth, of a bed, back, or support, a supplemental back vertically adjustable relatively thereto, and hinged or pivoted so as to be capable of a rocking movement, and a detent for locking the supplemental back in its adjusted position.

4. The combination, substantially as hereinbefore set forth, of a bed, back, or support, and a supplemental back adjustable to or from said support, as well as vertically relatively thereto.

5. The combination, substantially as hereinbefore set forth, of a bed, back, or support, a slide movable vertically therein, a detent for locking said slide in any desired position, and a supplemental back hinged to the slide, and having an oscillating or swiveling movement upon its supports.

6. The combination, substantially as hereinbefore set forth, of a bed, back, or support, a slide, a detent for locking the slide, a supplemental back hinged to the slide, and a set-screw for adjusting the supplemental back toward or from the stationary back.

7. The combination, substantially as hereinbefore set forth, of a bed, back, or support, an endwise-moving slide, a supplemental back or pad, and a link hinged both to the back and slide, whereby the supplemental back is capable of rocking on its hinges, to accommodate the movements of the occupant.

8. The combination, substantially as hereinbefore set forth, of a bed, back, or support, and a vertically-adjustable, oscillating, supplemental back.

9. The combination, substantially as hereinbefore set forth, of a bed, back, or support, and a supplemental back adjustable toward or from the bed or support, and capable of rocking upon its hinges, whereby it is enabled to accommodate itself to the position of the occupant.

10. The combination, in a chair, substantially as hereinbefore set forth, of a bed, back, or support, a seat portion separable therefrom, and a supplemental back capable of adjustment horizontally relatively to the seat, to insure the ease and comfort of the person occupying the chair, as set forth.

THOS. J. ROSS.

Witnesses:
GEO. E. ROSS,
FRANK STEWART.